US012580340B2

(12) United States Patent
Huang et al.

(10) Patent No.: US 12,580,340 B2
(45) Date of Patent: Mar. 17, 2026

(54) HYBRID CONNECTOR HOUSING, HYBRID CONNECTOR AND CONNECTOR ASSEMBLY

(71) Applicant: Tyco Electronics Technology (SIP) Ltd., Suzhou (CN)

(72) Inventors: Jianlin Huang, Suzhou (CN); Feng (Carlos) Pan, Suzhou (CN); Ky Zhu, Suzhou (CN)

(73) Assignee: Tyco Electronics Technology (SIP) Ltd., Suzhou (CN)

( * ) Notice: Subject to any disclaimer, the term of this patent is extended or adjusted under 35 U.S.C. 154(b) by 582 days.

(21) Appl. No.: 18/147,083

(22) Filed: Dec. 28, 2022

(65) Prior Publication Data

US 2023/0216232 A1 Jul. 6, 2023

(30) Foreign Application Priority Data

Dec. 31, 2021 (CN) ......................... 202111666804.1

(51) Int. Cl.
*H01R 13/502* (2006.01)
*H01R 13/424* (2006.01)
(Continued)

(52) U.S. Cl.
CPC ......... *H01R 13/502* (2013.01); *H01R 13/424* (2013.01); *H01R 13/4361* (2013.01);
(Continued)

(58) Field of Classification Search
CPC ........................... H01R 13/502; H01R 13/424; H01R 13/4361; H01R 13/5221; H01R 13/6581; H01R 13/6593
(Continued)

(56) References Cited

U.S. PATENT DOCUMENTS 8,696,380 B2 * 4/2014 Su ........................ H01R 13/504 439/345
9,496,667 B2 11/2016 Gardner
(Continued)

FOREIGN PATENT DOCUMENTS

CN 104508912 A 4/2015
CN 106165207 A 11/2016
(Continued)

OTHER PUBLICATIONS

Extended European Search Report dated May 17, 2023, corresponding to Application No. 22216985.6-1201, 15 pages.
(Continued)

*Primary Examiner* — Peter G Leigh
(74) *Attorney, Agent, or Firm* — Barley Snyder

(57) ABSTRACT

A connector housing comprises an inner housing including a rear housing, and a first sub housing and a second sub housing each formed integrally with the rear housing. The first sub housing is sized to accommodate a first cable assembly, and includes a rear end connected to a front side of the rear housing. The second sub housing is sized to accommodate a second cable assembly and a third cable assembly. A rear end of the second sub housing is connected to the front side of the rear housing. The first sub housing and the second sub housing are arranged side by side.

20 Claims, 12 Drawing Sheets

(51) Int. Cl.

| | |
|---|---|
| ***H01R 13/436*** | (2006.01) |
| ***H01R 13/52*** | (2006.01) |
| ***H01R 13/6581*** | (2011.01) |
| ***H01R 13/6593*** | (2011.01) |

(52) U.S. Cl.
CPC ..... *H01R 13/5221* (2013.01); *H01R 13/6581* (2013.01); *H01R 13/6593* (2013.01)

(58) Field of Classification Search
USPC .......................................................... 439/275
See application file for complete search history.

(56) References Cited

U.S. PATENT DOCUMENTS

| | | | | |
|---|---|---|---|---|
| 9,667,002 | B1 * | 5/2017 | Martin | H01R 13/4223 |
| 9,882,317 | B1 * | 1/2018 | Lane | H01R 24/20 |
| 10,559,914 | B2 | 2/2020 | Goossens et al. | |
| 11,527,855 | B2 | 12/2022 | Jung et al. | |
| 2004/0266265 | A1 | 12/2004 | Hayashi | |
| 2010/0158449 | A1 * | 6/2010 | Yi | G02B 6/3817 385/75 |
| 2012/0114288 | A1 * | 5/2012 | Wu | H01R 13/502 174/70 R |
| 2015/0155670 | A1 * | 6/2015 | Gardner | H01R 13/6463 439/587 |
| 2015/0295346 | A1 * | 10/2015 | Campbell | H01R 13/5208 439/589 |
| 2017/0170596 | A1 * | 6/2017 | Goossens | H01R 13/52 |
| 2020/0194938 | A1 * | 6/2020 | Jung | H01R 13/5205 |

FOREIGN PATENT DOCUMENTS

| | | | | | |
|---|---|---|---|---|---|
| CN | 107834261 | A | * | 3/2018 | H01R 13/4223 |
| CN | 107978928 | A | | 5/2018 | |
| CN | 111313172 | A | | 6/2020 | |
| CN | 107681290 | B | * | 10/2020 | H01R 9/22 |
| CN | 214849171 | U | | 11/2021 | |
| CN | 216672089 | U | | 6/2022 | |
| JP | 2004349024 | A | * | 12/2004 | H01R 13/518 |
| KR | 20150118828 | A | * | 10/2015 | H01R 13/6581 |
| WO | WO-2016017392 | A1 | * | 2/2016 | H01R 13/514 |

OTHER PUBLICATIONS

Chinese Office Action dated Jul. 21, 2025 with English translation, corresponding to Application No. 202111666804.1, 26 pages.

* cited by examiner

HYBRID CONNECTOR HOUSING, HYBRID CONNECTOR AND CONNECTOR ASSEMBLY

CROSS-REFERENCE TO RELATED APPLICATIONS

This application claims the benefit of Chinese Patent Application No. CN202111666804.1 filed on Dec. 31, 2021, in the State Intellectual Property Office of China, the whole disclosure of which is incorporated herein by reference.

FIELD OF THE INVENTION

The present invention relates to a hybrid connector housing, a hybrid connector including the hybrid connector housing and a connector assembly including the hybrid connector.

BACKGROUND

According to the prior art, connectors for laser radar systems generally include a housing, a power supply terminal provided in the housing for transmitting power, and an Ethernet signal terminal for transmitting an Ethernet signal. In order to prevent electromagnetic interference, it is necessary to set a shield connection member outside the Ethernet signal terminal. The shield connection member needs to be inserted into the mating shield connection member of the mating connector. Therefore, the housing is usually designed to include two separate sub housings, with the Ethernet signal terminal arranged in one sub housing, and the power supply terminal and other signal terminals arranged in another sub housing. Designing the housing as two separate sub housings will not only increase the cost of the connector, but also make it difficult to assemble.

SUMMARY

According to an embodiment of the present disclosure, a hybrid connector housing comprises an inner housing including a rear housing, and a first sub housing and a second sub housing each formed integrally with the rear housing. The first sub housing is sized to accommodate a first cable assembly, and includes a rear end connected to a front side of the rear housing. The second sub housing is sized to accommodate a second cable assembly and a third cable assembly. A rear end of the second sub housing is connected to the front side of the rear housing. The first sub housing and the second sub housing are arranged side by side.

BRIEF DESCRIPTION OF THE DRAWINGS

The invention will now be described by way of example with reference to the accompanying Figures, of which.

DETAILED DESCRIPTION OF THE EMBODIMENTS

Figure 1:
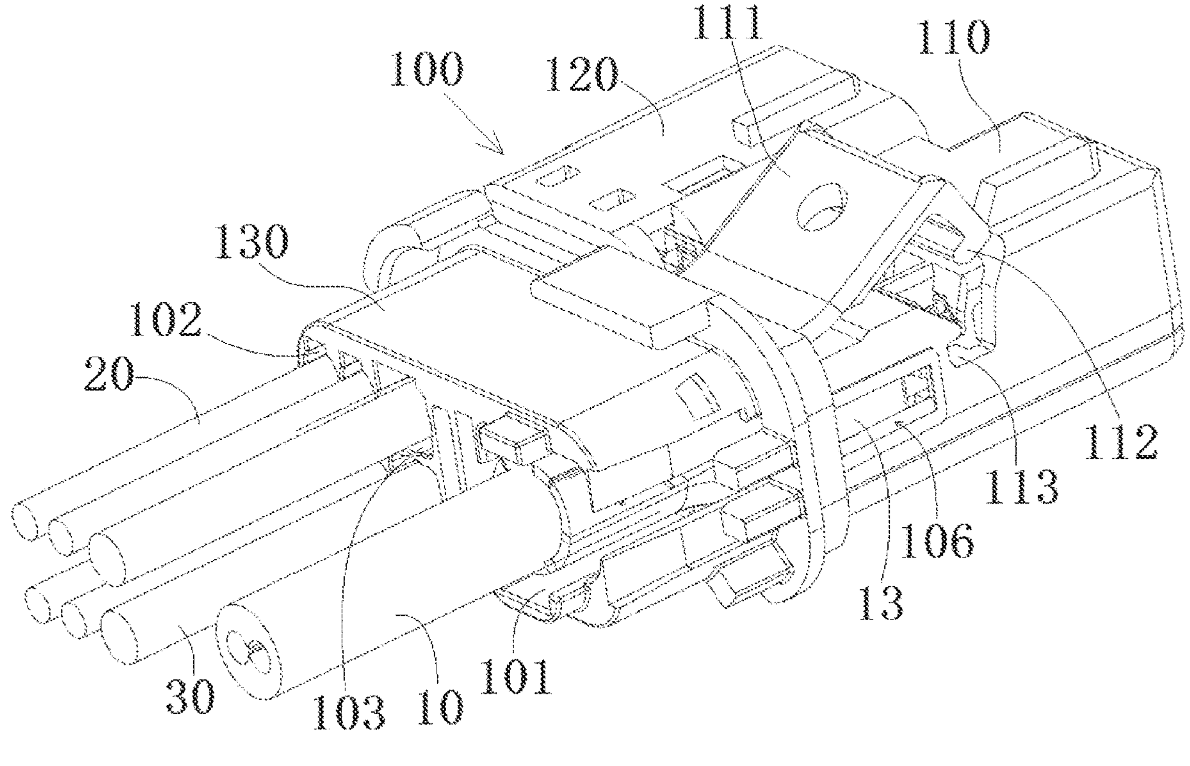
FIG. 1 shows an illustrative perspective view of a connector according to an exemplary embodiment of the present invention, in which a sealing assembly is not shown.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a hybrid connector housing comprises an inner housing. The inner housing includes a rear housing, a first sub housing, a rear end of which is connected to the front side of the rear housing, and a second sub housing, a rear end of which is connected to the front side of the rear housing. The first sub housing is adapted to accommodate a first cable assembly of a connector, and the second sub housing is adapted to accommodate a second cable assembly and a third cable assembly of the connector. The first sub housing and the second sub housing are arranged side by side, and the inner housing is embodied as an integral part.

According to another embodiment of the present disclosure, a hybrid connector housing comprises of a rear housing, a first sub housing having a rear end connected to the front side of the rear housing, and a second sub housing having a rear end connected to the front side of the rear housing. The first sub housing is provided with a first terminal cavity which continuously extends and passes through the rear housing for receiving a first cable assembly of a connector. The second sub housing is provided with a second terminal cavity and a third terminal cavity which continuously extend and pass through the rear housing, for respectively accommodating a second cable assembly and a third cable assembly of the connector. The first sub housing and the second sub housing are spaced apart from each other by a predetermined distance to form an avoiding slot between the first sub housing and the second sub housing that allows a mating shield connection member of the mating connector to pass through.

According to another embodiment of the present disclosure, a hybrid connector comprises the above hybrid connector housing, a first cable assembly inserted into the first sub housing of the hybrid connector housing, and a second cable assembly and a third cable assembly inserted into the second sub housing of the hybrid connector housing. The first cable assembly is used to transmit a first signal, the second cable assembly is used to transmit a second signal different from the first signal, and the third cable assembly is used to transmit power.

Figure 2:
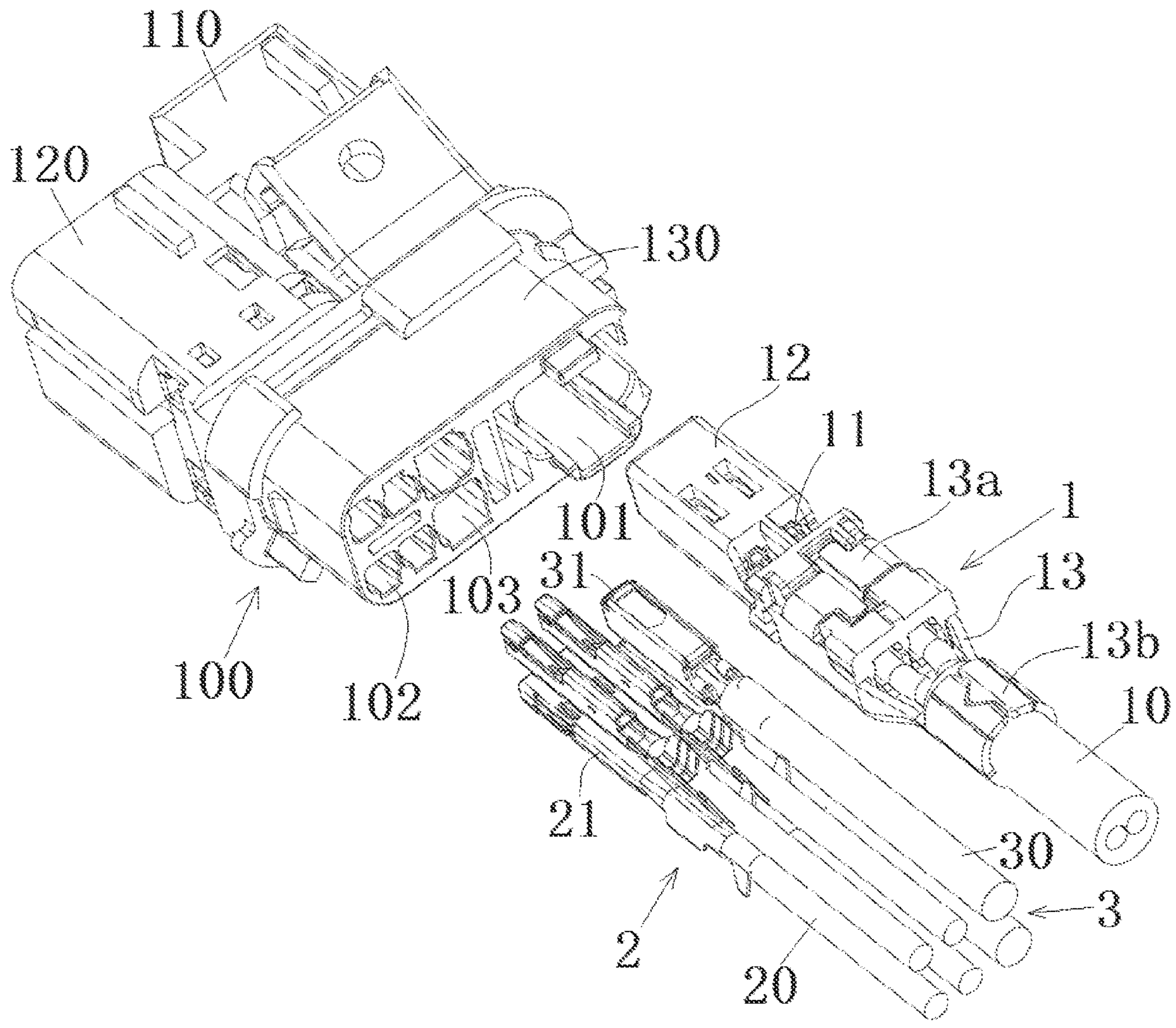
FIG. 2 shows an illustrative exploded view of a connector according to an exemplary embodiment of the present invention.

FIG. 1 shows an illustrative perspective view of a connector according to an exemplary embodiment of the present invention, in which a sealing assembly installed outside the inner housing 100 is not shown for the purpose of clarity. FIG. 2 shows an illustrative exploded view of a connector according to an exemplary embodiment of the present invention. As shown in FIGS. 1 and 2 a connector suitable for connection with, for example, a laser radar system is disclosed. The connector is a hybrid connector, which includes a power terminal for transmitting power and a signal terminal for transmitting signals. In the illustrated embodiment, the connector includes a connector housing, a first cable assembly 1, a second cable assembly 2, and a third cable assembly 3. The connector housing includes an integrally formed inner housing 100. The first cable assembly 1 is inserted into a first sub housing 110 of the inner housing 100. The second cable assembly 2 and the third cable assembly 3 are inserted into a second sub housing 120 of the inner housing 100. In the illustrated embodiment, the first cable assembly 1 is used to transmit a first signal, for example, an Ethernet signal. The second cable assembly 2 is used for transmitting a second signal different from the first signal, for example, for transmitting a local area network signal. The third cable assembly 3 is used to transmit power. That is, the connector in the present invention is a hybrid connector capable of simultaneously transmitting signals and power.

The first cable assembly 1 includes a first cable 10, a first terminal 11, a terminal holder 12, and a shield connection member 13. The first terminal 11 is connected to the first cable 10. The first terminal 11 is held in the terminal holder 12. One end 13*a* of the shield connection member 13 is fixed to the terminal holder 12, and the other end 13*b* is electrically connected to the shield layer of the first cable 10. The second cable assembly 2 includes a second cable 20 and a second terminal 21, and the second terminal 21 is connected to the second cable 20. The third cable assembly 3 includes a third cable 30 and a third terminal 31, and the third terminal 31 is connected to the third cable 30. Each of the first cable assembly 1, the second cable assembly 2, and the third cable assembly 3 can be simultaneously inserted into the inner housing 100, easing the assembly processes.

Figure 3:
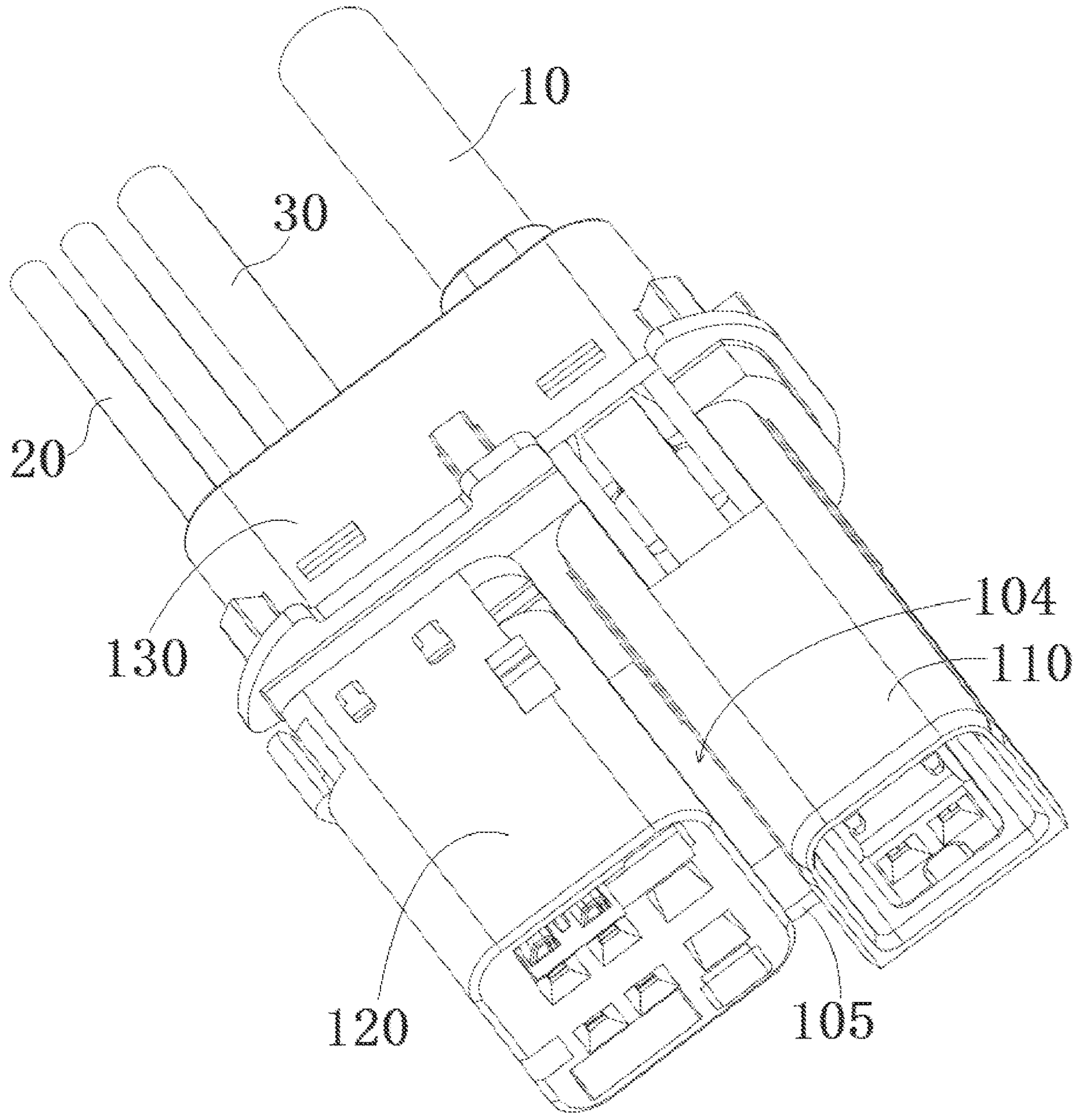
FIG. 3 shows an illustrative perspective view of a connector according to an exemplary embodiment of the present invention when viewed from the lower side.
Figure 4:
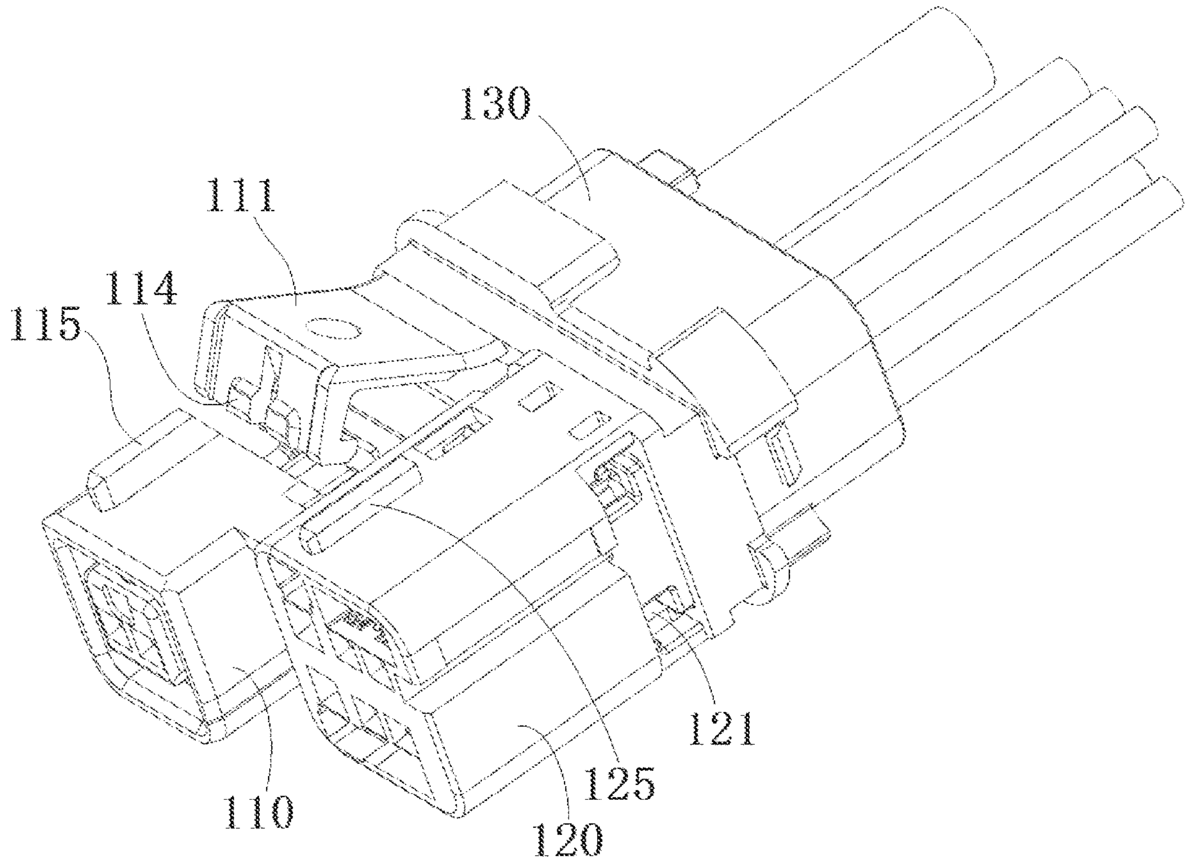
FIG. 4 shows an illustrative perspective view of a connector according to an exemplary embodiment of the present invention when viewed from one side thereof.
Figure 5:
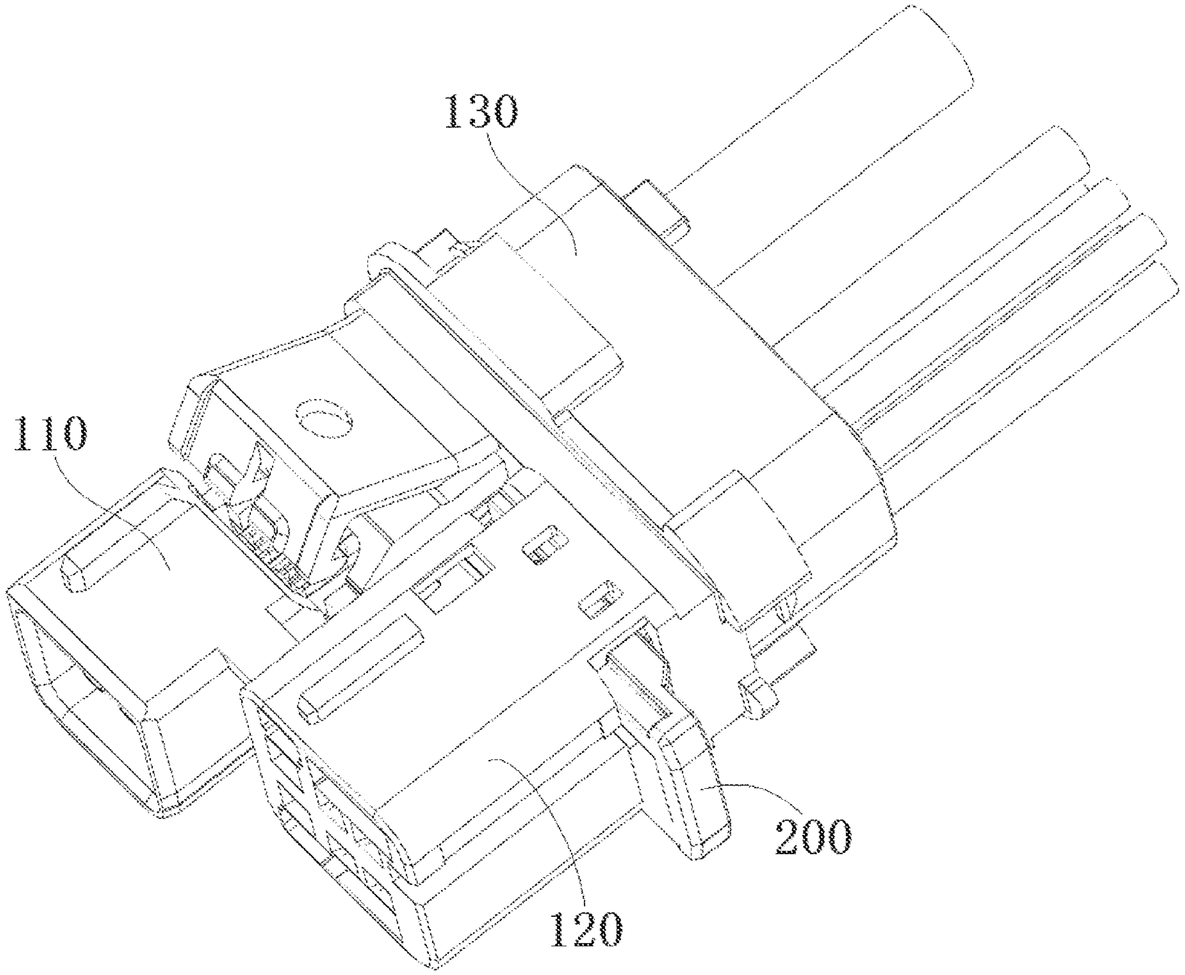
FIG. 5 shows an illustrative perspective view of a connector according to an exemplary embodiment of the present invention when viewed from one side thereof, in which a locking member is shown.
Figure 6:
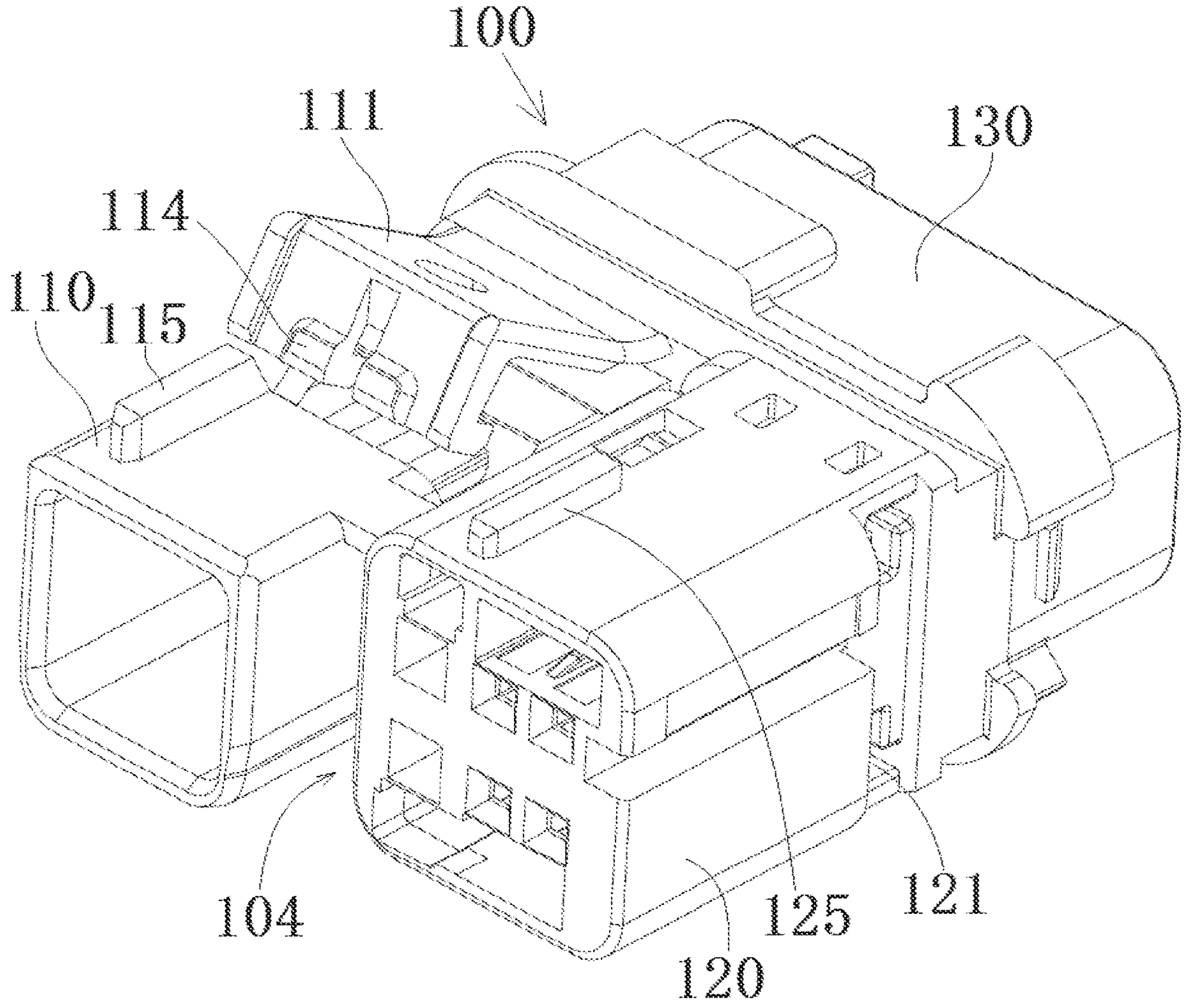
FIG. 6 shows an illustrative perspective view of an inner housing of a connector according to an exemplary embodiment of the present invention.
Figure 7:
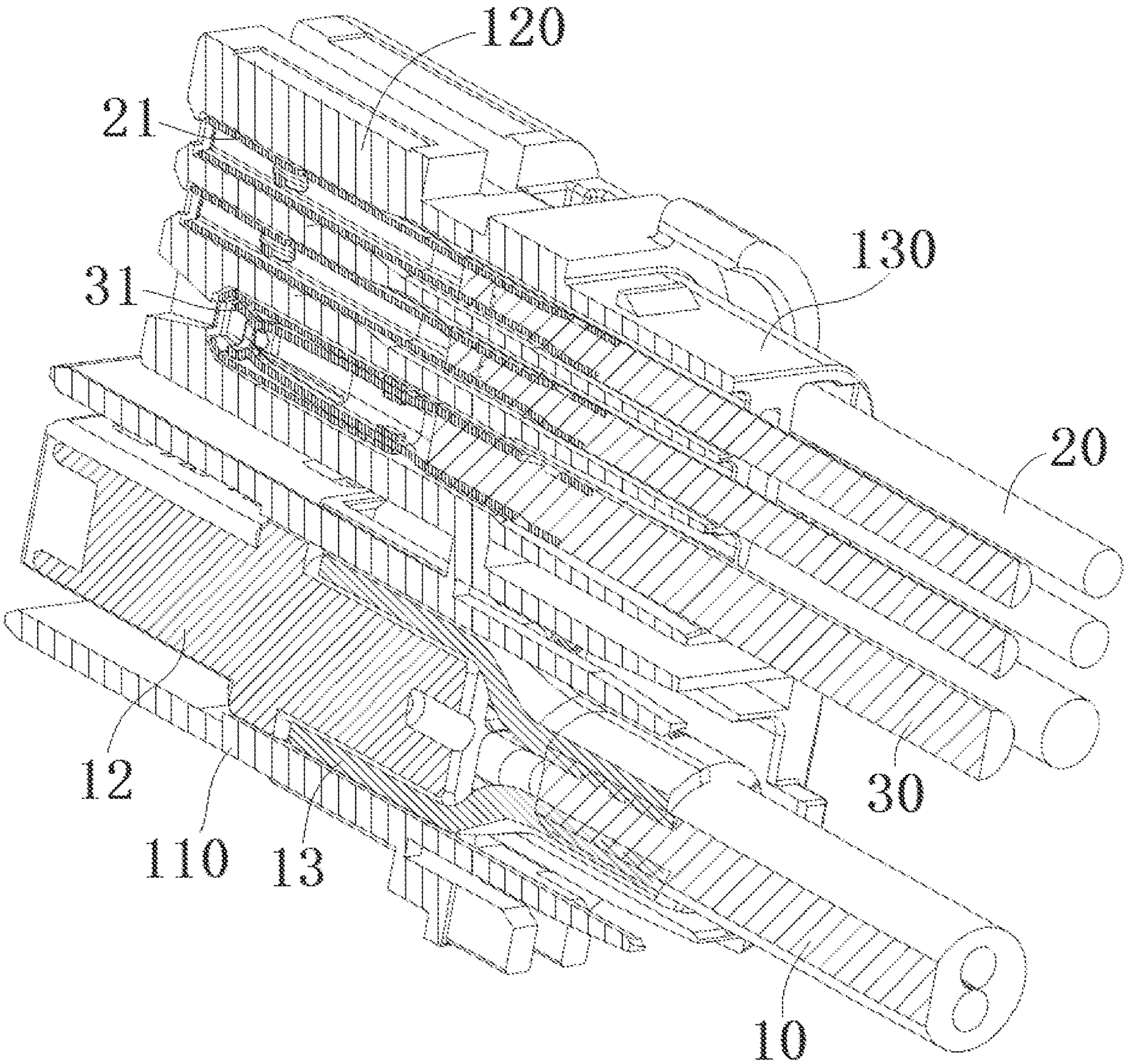
FIG. 7 shows a cross-sectional view of a connector according to an exemplary embodiment of the present invention, in which the sealing assembly is not shown.

FIG. 3 shows an illustrative perspective view of a connector according to an exemplary embodiment of the present invention when viewed from the lower side. FIG. 4 shows an illustrative perspective view of a connector according to an exemplary embodiment of the present invention when viewed from one side thereof. FIG. 5 shows an illustrative perspective view of a connector according to an exemplary embodiment of the present invention when viewed from one side thereof, in which the locking member 200 is shown. FIG. 6 shows an illustrative perspective view of an inner housing 100 according to an exemplary embodiment of the present invention. FIG. 7 shows a cross-sectional view of a connector according to an exemplary embodiment of the present invention.

As shown in FIGS. 1-7, in the exemplary embodiment, the inner housing 100 includes a rear housing 130, a first sub housing 110, and a second sub housing 120. The rear end of the first sub housing 110 is connected to the front side of the rear housing 130 for accommodating the first cable assembly 1 of the connector. The rear end of the second sub housing 120 is connected to the front side of the rear housing 130 for accommodating the second cable assembly 2 and the third cable assembly 3 of the connector. The first sub housing 110 and the second sub housing 120 are arranged side by side, and may be formed integrally with a remainder of the inner housing 100. For example, the inner housing 100 may be an integral injection molded part, an integral machined part, or an integral 3D printed part. The first sub housing 110 and the second sub housing 120 are spaced apart from each other by a predetermined distance to form an avoiding slot 104 therebetween. The slot 104 allows a mating shield connection member (not shown) of a mating connector (not shown) to pass through. The front end of the first sub housing 110 protrudes from the front end of the second sub housing 120 in the longitudinal direction. That is, the first sub housing 110 extends forward beyond the second sub housing 120.

The inner housing 100 further includes a connecting plate 105. The connecting plate 105 is connected between the front ends of the first sub housing 110 and the second sub housing 120 and is located at a position that does not interfere with the mating shield connection member. In this way, the strength of the first sub housing 110 and the second sub housing 120 can be improved and the front ends thereof can be prevented from being deformed.

The inner housing 100 is formed with a first terminal cavity 101 penetrating through the rear housing 130 and the first sub housing 110 in the longitudinal direction. The first cable assembly 1 is adapted to be inserted into the first terminal cavity 101. The inner housing 100 is also formed with a second terminal cavity 102 and a third terminal cavity 103 penetrating through the rear housing 130 and the second sub housing 120 in the longitudinal direction. The second cable assembly 2 and the third cable assembly 3 are adapted to be inserted into the second terminal cavity 102 and the third terminal cavity 103, respectively.

An opening 106 for exposing the shield connection member 13 of the connector is formed in the side wall of the first sub housing 110. The mating shield connection member of the mating connector is directly or indirectly electrically connected to the shield connection member 13 of the connector exposed through the opening 106. The first sub housing 110 further includes an elastic latch 111 and 112. The elastic latch 111 and 112 is integrally formed on the first sub housing 110 to lock the first cable assembly 1 in the first sub housing 110 to prevent the first cable assembly 1 from being pulled out of the first sub housing 110.

The elastic latch 111 and 112 includes an elastic cantilever 111 and a hook like buckle 112. The elastic cantilever 111 is connected to the side wall of the housing 100. The hook like buckle 112 is connected to the end of the elastic cantilever 111. The first sub housing 110 is formed with a slot 113 adapted to fit with the hook like buckle 112. When the hook like buckle 112 is locked into the slot 113, a protrusion 114 formed on one side of the hook like buckle 112 abuts against the first terminal 11 of the first cable assembly 1 to lock the first terminal 11 in the first sub housing 110. Thus, the first cable assembly I can be prevented from being pulled out of the first sub housing 110.

The connector further includes a locking member 200. The locking member 200 is used to lock the second terminal 21 of the second cable assembly 2 and the third terminal 31 of the third cable assembly 3 in the second sub housing 120. The second sub housing 120 is formed with a locking slot 121 extending in a transverse direction thereof for inserting the lock member 200. When the locking member 200 is inserted into the locking slot 121, the locking member simultaneously abuts against the second terminal 21 of the second cable assembly 2 and the third terminal 31 of the third cable assembly 3 to lock the second terminal and the third terminal in the second sub housing 120. Thus, the second cable assembly 2 and the third cable assembly 3 can be prevented from being pulled out of the second sub housing 120.

A first guide rib 115 is formed on the outer surface of the first sub housing 110. The first guide rib 115 extends along the longitudinal direction of the first sub housing 110 and is used to mate with a first guide slot (not shown) formed on a mating housing (not shown) of the mating connector to guide the first sub housing into the mating housing. Similarly, a second guide rib 125 is formed on the outer surface of the second sub housing 120. The second guide rib 125 extends along the longitudinal direction of the second sub housing 120 and is used to mate with a second guide slot (not shown) formed on the mating housing of the mating connector to guide the second sub housing to be inserted into the mating housing.

According to an exemplary embodiment of the present disclosure, a connector is also disclosed which includes the aforementioned inner housing 100, a first cable assembly 1, a second cable assembly 2, and a third cable assembly 3. The first cable assembly 1 is inserted into the first sub housing 110 of the inner housing 100. The second cable assembly 2 and the third cable assembly 3 are inserted into the second sub housing 120 of the inner housing 100. The third cable assembly 3 is arranged between the first cable assembly 1 and the second cable assembly 2. The shield connection member 13 at least includes a partition wall between the first cable assembly 1 and the third cable assembly 3 for isolating the first cable assembly 1 from the third cable assembly 3.

Figure 8:
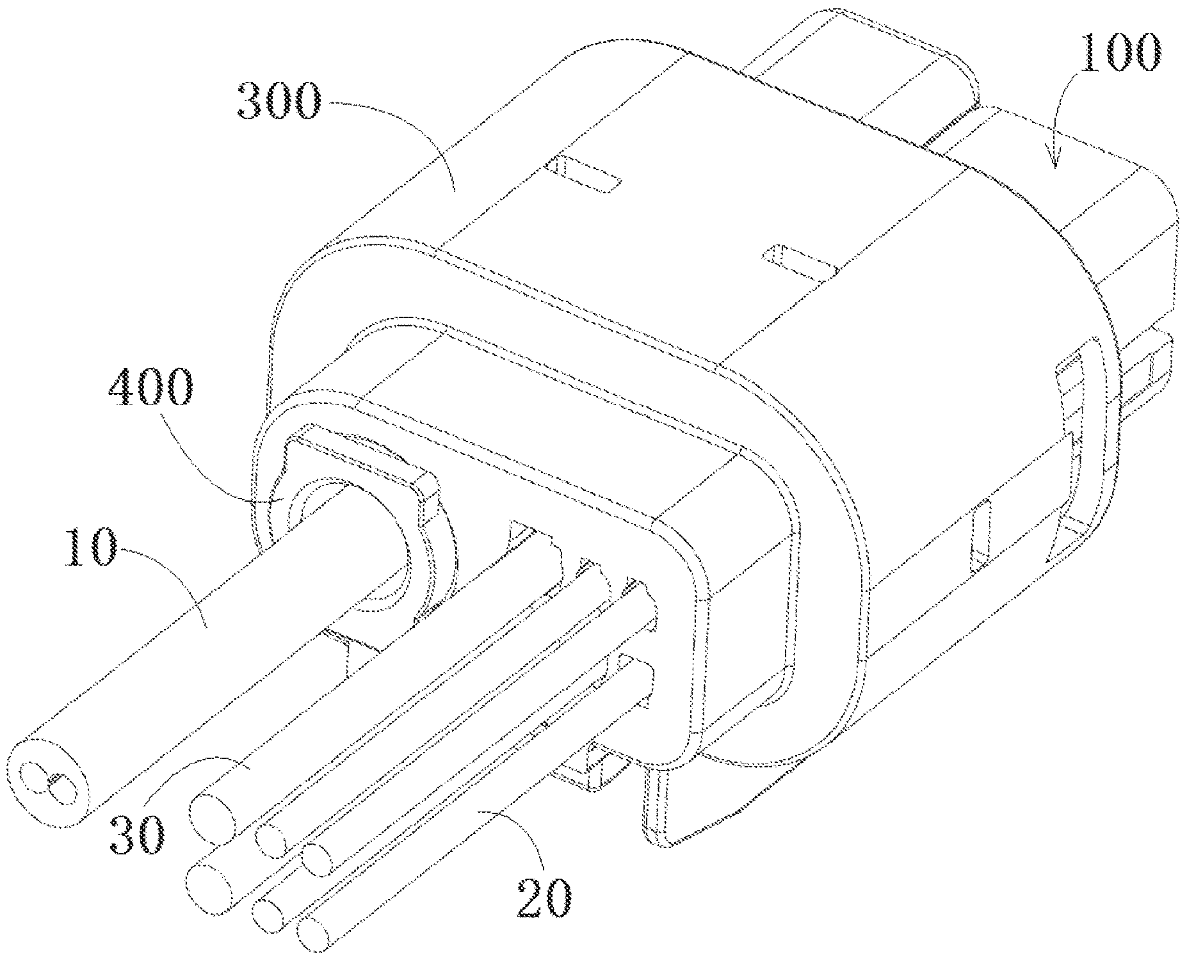
FIG. 8 shows an illustrative perspective view of a connector according to an exemplary embodiment of the present invention, in which a seal protecting an end cap and a seal assembly are shown.
Figure 9:
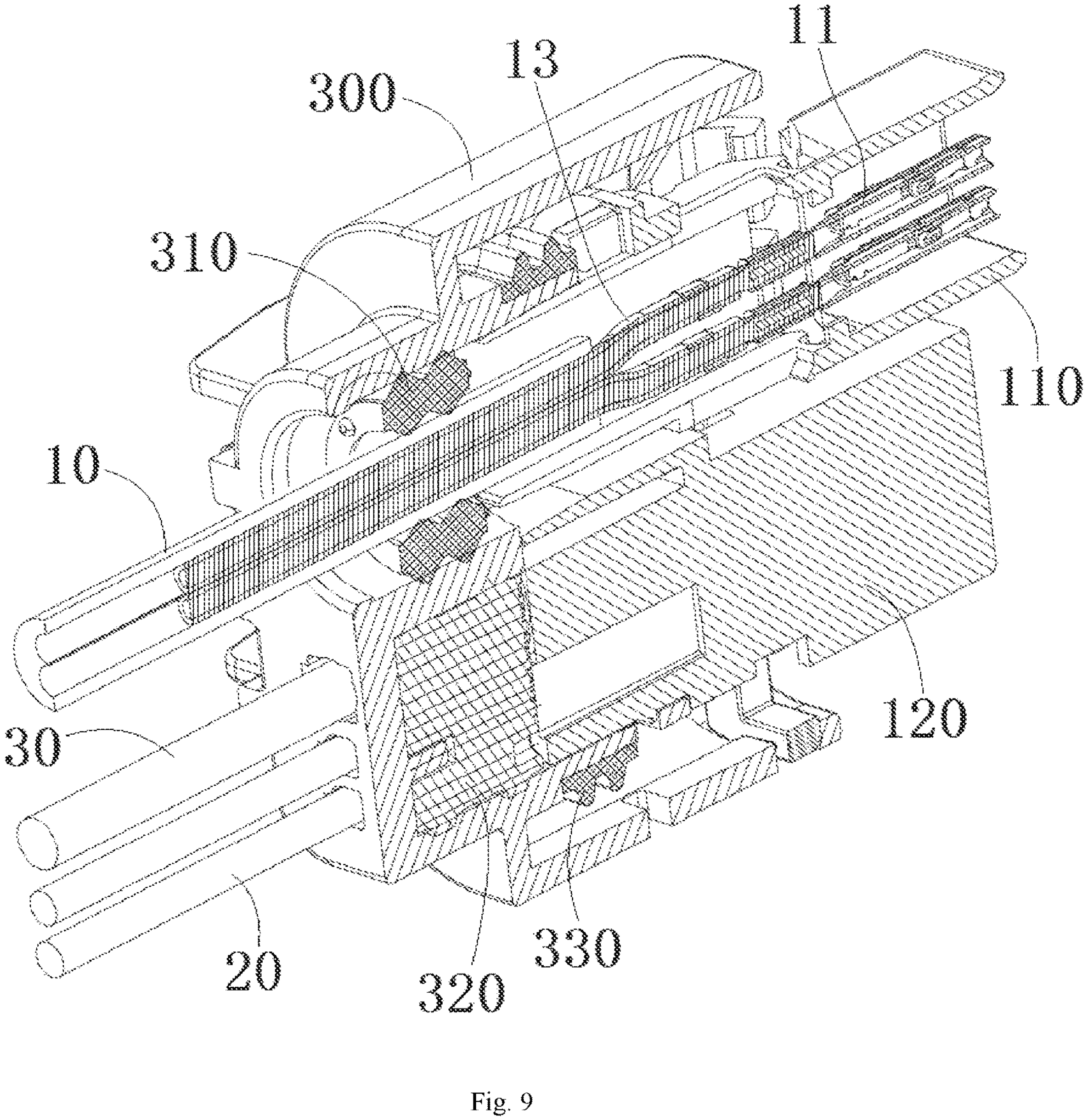
FIG. 9 shows a cross-sectional view of a connector according to an exemplary embodiment of the present invention showing a sealing assembly.
Figure 10:
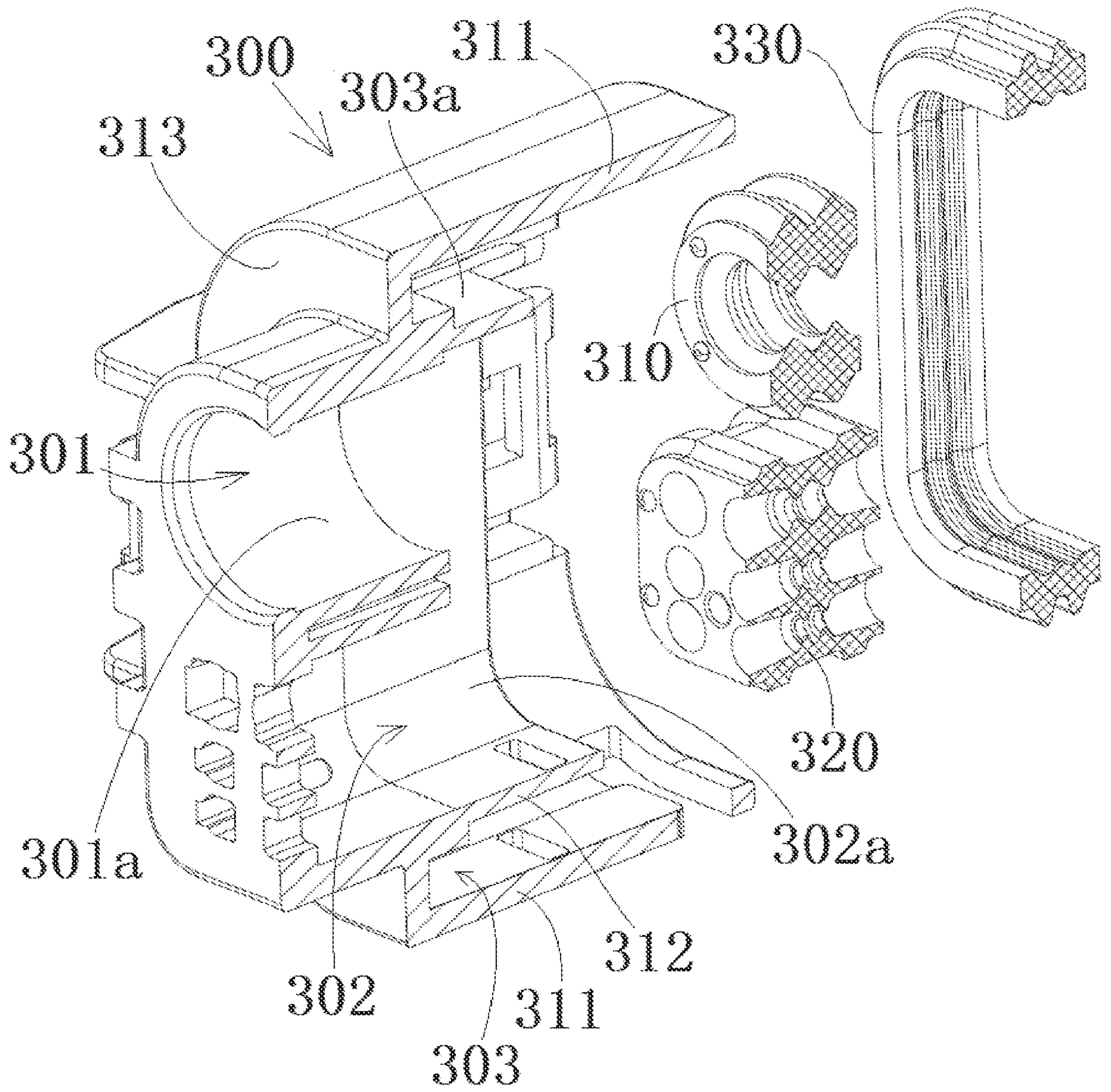
FIG. 10 shows an illustrative exploded view of a sealing assembly according to an exemplary embodiment of the present invention.
Figure 11:
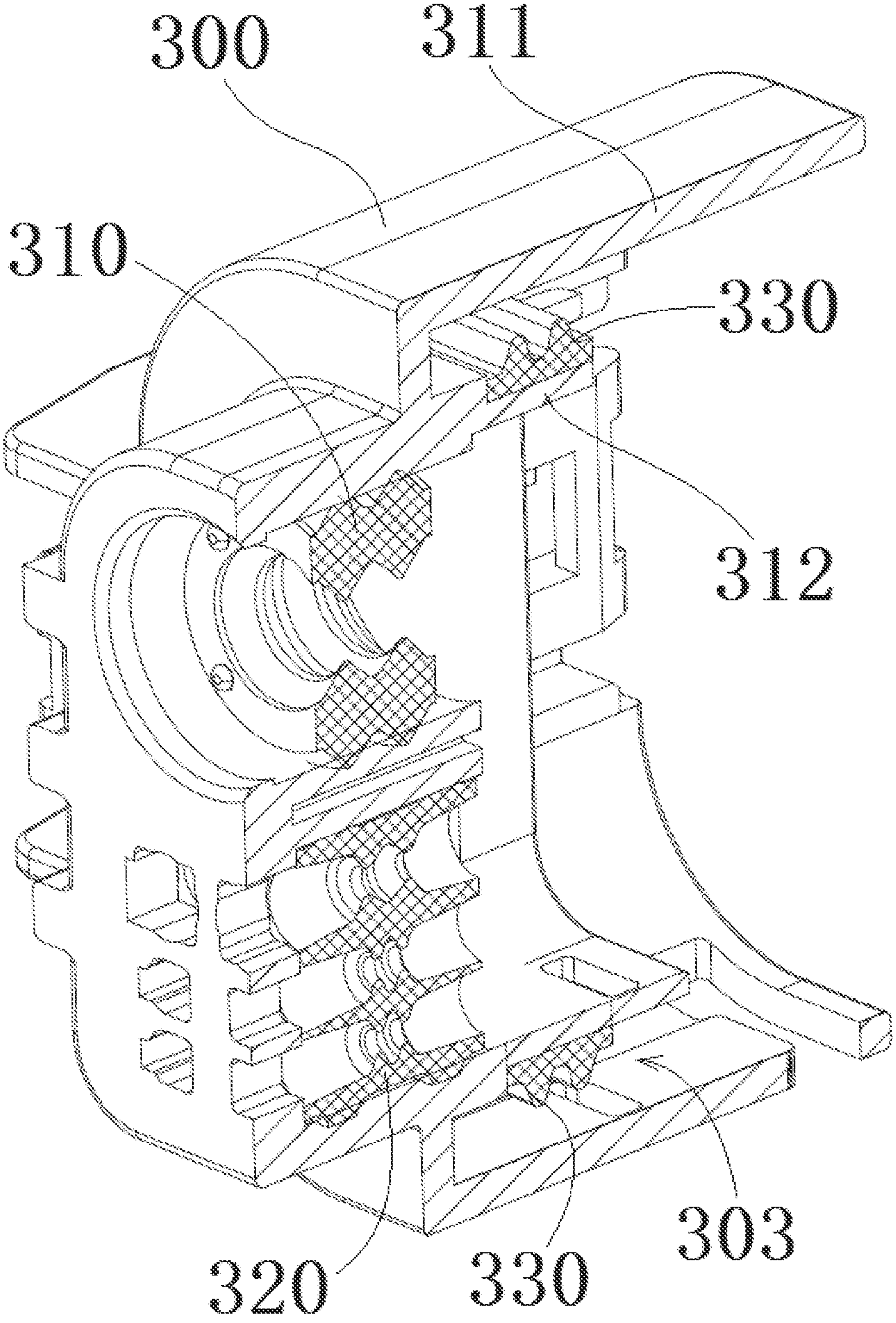
FIG. 11 shows a cross-sectional view of a sealing assembly according to an exemplary embodiment of the present invention.

FIG. 8 shows an illustrative perspective view of a connector according to an exemplary embodiment of the present invention, in which a seal protection end cap 400 and a seal assembly are shown. FIG. 9 shows a cross-sectional view of a connector according to an exemplary embodiment of the present invention showing a sealing assembly. FIG. 10 shows an illustrative exploded view of a sealing assembly according to an exemplary embodiment of the present invention. FIG. 11 shows a cross-sectional view of a sealing assembly according to an exemplary embodiment of the present invention.

As shown in FIGS. 8-11, the connector further includes a sealing assembly. The sealing assembly includes an outer housing 300, the cable seals 310, 320, and a housing seal 330. A plurality of seal mounting portions 301*a*, 302*a*, 303*a* are provided inside the outer housing 300. The cable seals 310 and 320 are mounted on the cable seal mounting portions 301*a*, 302*a* of the plurality of seal mounting portions 301*a*, 302*a*, 303*a*, and are used to realize the sealing between the outer housing 300 and the cables 10, 20, 30 extending into the outer housing 300. The housing seal 330 is mounted on a housing seal mounting portion 303*a* of the plurality of seal mounting portions 301*a*, 302*a*, 303*a*, and is used to realize the sealing between the outer housing 300 and the mating housing of the mating connector.

The cable seals 310, 320 include a first cable seal 310 and a second cable seal 320. The first cable seal 310 is used to seal at least one of the cables 10 of the connector. The second cable seal 320 is used to seal other cables 20, 30 of the connector. A first accommodation chamber 301 and a second accommodation chamber 302 are formed in the outer housing 300. The first accommodation chamber 301 is used to accommodate the first cable seal 310, and the chamber wall of the first accommodation chamber 301 is sealingly engaged with the first cable seal. The second accommodation chamber 302 is used to accommodate the second cable seal 320, and the chamber wall of the second accommodation chamber is sealingly engaged with the second cable seal. The seal assembly further includes a seal protection end cap 400. The seal protection end cover 400 is fixed to an opening of the first accommodation chamber 301 of the housing 300, and is used to hold the first cable seal 310 in the first accommodation chamber to prevent the first cable seal 310 from being pulled out from the first accommodation chamber.

The outer housing 300 includes an outer peripheral wall 311, an inner peripheral wall 312, and a radial side wall 313. The inner peripheral wall 312 is radially spaced from the outer peripheral wall 311. The radial side wall 313 is connected between the outer peripheral wall 311 and the inner peripheral wall 312. The inner peripheral wall 312 isolates the first accommodation chamber 301 from the second accommodation chamber 302. A third accommodation chamber 303 for accommodating the housing seal 330 is defined by the outer peripheral wall 311, the inner peripheral wall 312 and the radial side wall 313. In the illustrated embodiment, the housing seal 330 is provided on the outer side of the inner peripheral wall 312 and is sealingly engaged therewith.

Figure 12:
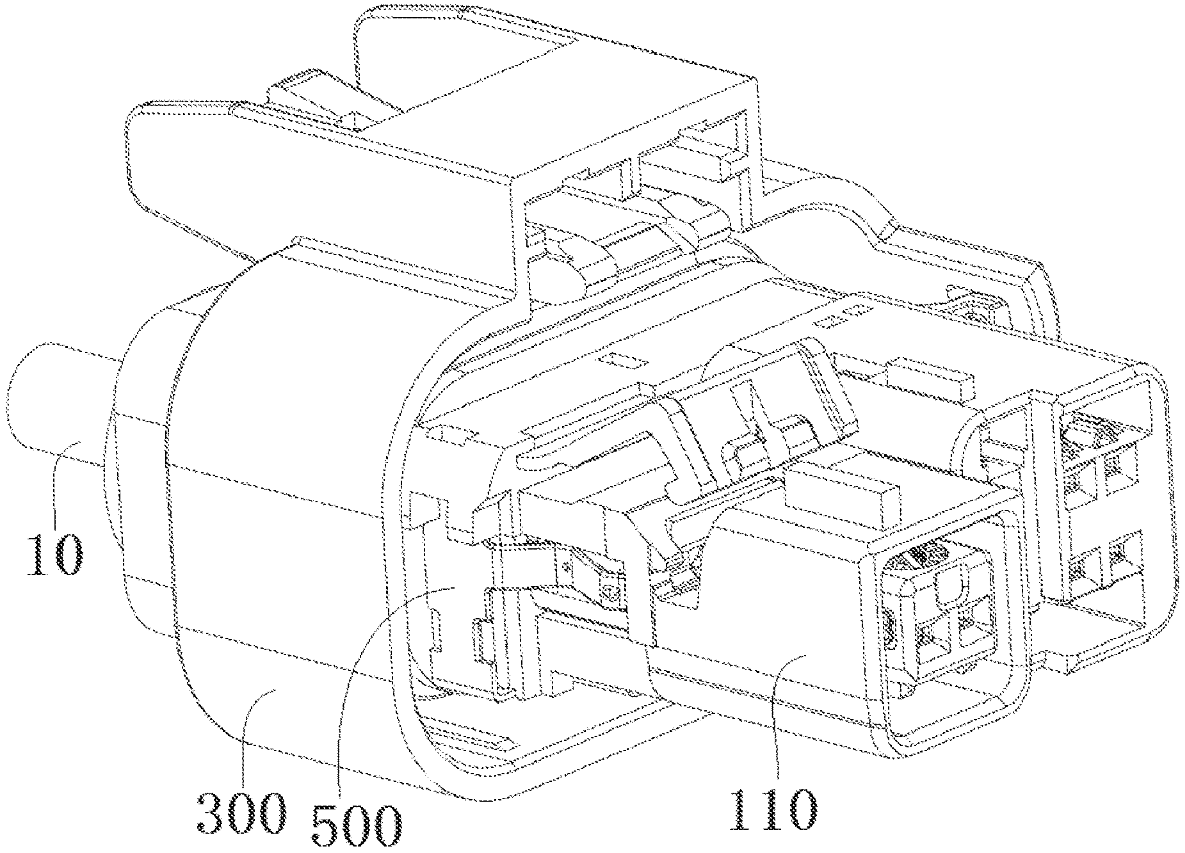
FIG. 12 shows an illustrative perspective view of a connector according to an exemplary embodiment of the present invention, in which a shielded adapter is shown.

FIG. 12 shows an illustrative perspective view of a connector according to an exemplary embodiment of the present invention, in which a shielded adapter 500 is shown. As shown in FIGS. 1-12, the connector further includes a shield adapter 500. The shield adapter 500 is used to electrically connect the shield connection member 13 of the connector to the mating shield connection member of the mating connector. The shield adapter 500 is mounted on the first sub housing 110 and is electrically connected to the shield connection member 13 which is provided in the first sub housing and exposed through the opening 106.

A connector housing is also disclosed. The connector housing includes the rear housing 130, the first sub housing 110 and the second sub housing 120. The rear end of the first sub housing 110 is connected to the front side of the rear housing 130. The first sub housing 110 is provided with the first terminal cavity 101, which extends continuously and passes through the rear housing 130 to accommodate the first cable assembly 1 of the connector. The rear end of the second sub housing 120 is connected to the front side of the rear housing 130. The second sub housing 110 is provided with the second terminal cavity 102 and the third terminal cavity 103. The second terminal cavity 102 and the third terminal cavity 103 extend continuously and pass through the rear housing 130 to accommodate the second cable assembly 2 and the third cable assembly 3 of the connector, respectively. The first sub housing 110 and the second sub housing 120 are spaced apart from each other by a predetermined distance to form an avoiding slot 104 between the first sub housing and the second sub housing that allows the mating shield connection member of the mating connector to pass through. The first terminal cavity 101 and the second terminal cavity 102 are respectively used to accommodate the first terminal 11 and the second terminal 21 that transmit different types of signals. The third terminal cavity 103 is disposed between the first terminal cavity 101 and the second terminal cavity 102 to accommodate the third terminal 31 for transmitting power.

In an exemplary embodiment of the present invention, there is also disclosed a connector assembly including the aforementioned connector and a mating connector adapted to mate with the aforementioned connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of the elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector housing, comprising:

an inner housing including:

a rear housing;

a first sub housing formed integrally with the rear housing and sized to accommodate a first cable assembly, the first sub housing having a rear end connected to a front side of the rear housing; and a second sub housing formed integrally with the rear housing and sized to accommodate a second cable assembly and a third cable assembly, a rear end of the second sub housing connected to the front side of the rear housing, the first sub housing and the second sub housing are arranged side by side; and a seal assembly including an outer housing in which a plurality of seal mounting portions are provided, and a cable seal mounted on a cable seal mounting portion of the plurality of seal mounting portions, a chamber wall of a first accommodation chamber of the outer housing receives and is sealingly engaged with a first cable seal of the cable seal, and a chamber wall of a second accommodation chamber of the outer housing receives and is sealingly engaged with a second cable seal of the cable seal.

2. The connector housing according to claim 1, further comprising a connecting plate connected between front ends of the first sub housing and the second sub housing.

3. The connector housing according to claim 1, wherein the inner housing defines:

a first terminal cavity penetrating through the rear housing and the first sub housing in a longitudinal direction, the first cable assembly is adapted to be inserted into the first terminal cavity; and a second terminal cavity and a third terminal cavity penetrating through the rear housing and the second sub housing in the longitudinal direction, the second cable assembly and the third cable assembly are adapted to be inserted into the second terminal cavity and the third terminal cavity, respectively.

4. The connector housing according to claim 1, wherein a front end of the first sub housing extends beyond a front end of the second sub housing.

5. The connector housing according to claim 1, wherein an opening is formed in a side wall of the first sub housing and is located to expose a shield connection member of the first cable assembly.

6. The connector housing according to claim 1, wherein the first sub housing includes an integral elastic latch and adapted to lock the first cable assembly in the first sub housing, wherein the elastic latch includes:

an elastic cantilever connected to a side wall of the first sub housing; and a buckle connected to an end of the elastic cantilever, the first sub housing is formed with a slot adapted to mate with the buckle, the buckle abutting against a first terminal of the first cable assembly when locked into the slot to lock the first terminal in the first sub housing.

7. The connector housing according to claim 1, further comprising a locking member adapted to lock a second terminal of the second cable assembly and a third terminal of the third cable assembly in the second sub housing, the second sub housing defining a locking slot extending along a transverse direction of the second sub housing for receiving the locking member, the locking member simultaneously abutting against the second terminal and the third terminal when inserted into the locking slot to lock the second terminal and the third terminal in the second sub housing.

8. The connector housing according to claim 1, further comprising at least one of:

a first guide rib formed on the outer surface of the first sub housing and extending along a longitudinal direction of the first sub housing; or a second guide rib formed on the outer surface of the second sub housing and extending along a longitudinal direction of the second sub housing.

9. The connector housing according to claim 1, wherein the seal assembly includes a housing seal mounted on a housing seal mounting portion of the plurality of seal mounting portions and forming a seal between the housing and a mating housing of a mating connector, the cable seal forms a seal between the outer housing and a cable extending into the outer housing.

10. The connector housing according to claim 1, wherein the sealing assembly further comprises a seal protection end cap fixed to an opening of the first accommodation chamber of the outer housing.

11. The connector housing according to claim 1, wherein the outer housing includes:
an outer peripheral wall;
an inner peripheral wall radially spaced from the outer peripheral wall; and
a radial side wall connected between the outer peripheral wall and the inner peripheral wall,
the inner peripheral wall isolating the first accommodation chamber from the second accommodation chamber, a third accommodation chamber receiving the housing seal is defined by the outer peripheral wall, the inner peripheral wall and the radial side wall, the housing seal disposed on the outer side of the inner peripheral wall and sealingly engaged with the inner peripheral wall.

12. The connector housing according to claim 1, wherein the first sub housing and the second sub housing are spaced apart from each other by a predetermined distance to form an avoiding slot between the first sub housing and the second sub housing.

13. A connector, comprising:
a rear housing;
a first sub housing defining a first terminal cavity extending therethrough and receiving a first cable assembly, a rear end of the first sub housing connected to a front side of the rear housing;
a second sub housing defining a second terminal cavity and a third terminal cavity extending therethrough and receiving a respective one of a second cable assembly and a third cable assembly of the connector, the first sub housing and the second sub housing spaced apart from each other to define a slot therebetween, the first cable assembly includes a first cable, a first terminal connected to the first cable, a terminal holder in which the first terminal is held, and a shield connection member having one end fixed to the terminal holder and an other end electrically connected to a shield layer of the first cable; and
a shield adapter electrically connecting the shield connection member to a mating shield connection member of a mating connector.

14. The connector according to claim 13, wherein the shield adapter is mounted on the first sub housing and is electrically connected to the shield connection member.

15. The connector according to claim 14, the shield connection member arranged within the first sub housing and exposed through an opening formed therethrough.

16. The connector according to claim 13, wherein the second cable assembly includes a second cable, and a second terminal connected to the second cable.

17. The connector according to claim 13, wherein the third cable assembly includes:
a third cable; and
a third terminal connected to the third cable, the third cable assembly arranged between the first cable assembly and the second cable assembly.

18. The connector according to claim 17, wherein the shield connection member includes at least a partition wall between the first cable assembly and the third cable assembly for isolating the first cable assembly from the third cable assembly.

19. A connector housing, comprising:
an inner housing including a rear housing, a first sub housing formed integrally with the rear housing and accommodating a first cable assembly, and a second sub housing formed integrally with the rear housing and accommodating a second cable assembly and a third cable assembly, the first sub housing having a rear end connected to a front side of the rear housing and an elastic latch integrally formed on the first sub housing, the elastic latch locks the first cable assembly in the first sub housing, a rear end of the second sub housing is connected to the front side of the rear housing, the first sub housing and the second sub housing are arranged side by side; and
a locking member locking a second terminal of the second cable assembly and a third terminal of the third cable assembly in the second sub housing, the second sub housing defining a locking slot extending along a transverse direction of the second sub housing for receiving the locking member, the locking member simultaneously abutting against the second terminal and the third terminal when inserted into the locking slot to lock the second terminal and the third terminal in the second sub housing.

20. A connector, comprising:
a rear housing;
a first sub housing defining a first terminal cavity extending therethrough and receiving a first cable assembly, a rear end of the first sub housing connected to a front side of the rear housing; and
a second sub housing defining a second terminal cavity and a third terminal cavity extending therethrough and receiving a respective one of a second cable assembly and a third cable assembly of the connector, the first sub housing and the second sub housing spaced apart from each other to define a slot therebetween, the first cable assembly includes a first cable, a first terminal connected to the first cable, a terminal holder in which the first terminal is held, and a shield connection member having one end fixed to the terminal holder and an other end electrically connected to a shield layer of the first cable, the shield connection member includes a partition wall between the first cable assembly and the third cable assembly isolating the first cable assembly from the third cable assembly.

* * * * *